United States Patent
Davis et al.

(10) Patent No.: US 8,335,235 B2
(45) Date of Patent: Dec. 18, 2012

(54) METHODS AND APPARATUS FOR EXTENDING MAC CONTROL MESSAGE IN EPON

(75) Inventors: Lawrence D. Davis, Petaluma, CA (US); Glen Kramer, Petaluma, CA (US); Jaroslaw Wojtowicz, Santa Rosa, CA (US); Ryan E. Hirth, Windsor, CA (US); Edward W. Boyd, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 347 days.

(21) Appl. No.: 12/725,219

(22) Filed: Mar. 16, 2010

(65) Prior Publication Data
US 2010/0239252 A1  Sep. 23, 2010

Related U.S. Application Data

(60) Provisional application No. 61/162,188, filed on Mar. 20, 2009.

(51) Int. Cl.
*H04J 3/24* (2006.01)
*H04J 3/06* (2006.01)
*H04L 12/56* (2006.01)
*H04B 12/20* (2006.01)

(52) U.S. Cl. ... 370/474; 370/503; 370/468; 370/395.51; 370/392; 370/412; 398/58; 398/69

(58) Field of Classification Search ............... 370/230, 370/395.5, 395.51, 907, 395.4, 395.41, 252, 370/389, 390, 392, 474, 468, 469, 350, 503, 370/518–519, 412; 398/58, 66–68, 69–70, 398/71–72
See application file for complete search history.

(56) References Cited

U.S. PATENT DOCUMENTS

| | | | |
|---|---|---|---|
| 7,301,970 B2* | 11/2007 | Kim et al. ............... | 370/535 |
| 7,443,861 B2* | 10/2008 | Lee et al. ............... | 370/395.42 |
| 7,843,965 B2* | 11/2010 | Lai et al. ............... | 370/468 |
| 8,107,824 B2* | 1/2012 | Tsuchiya et al. ........ | 398/168 |
| 2004/0146301 A1* | 7/2004 | Choi et al. .............. | 398/58 |
| 2005/0041682 A1* | 2/2005 | Kramer .................... | 370/458 |
| 2005/0100036 A1* | 5/2005 | Davis ...................... | 370/432 |
| 2006/0136715 A1* | 6/2006 | Han et al. ............... | 713/151 |
| 2006/0268704 A1* | 11/2006 | Ansari et al. ........... | 370/230 |
| 2007/0133800 A1* | 6/2007 | Kim et al. ............... | 380/256 |
| 2008/0181248 A1* | 7/2008 | Haran et al. ............ | 370/412 |
| 2010/0110898 A1* | 5/2010 | Effenberger et al. ... | 370/241.1 |

* cited by examiner

*Primary Examiner* — Andrew Lai
*Assistant Examiner* — Candal Elpenord
(74) *Attorney, Agent, or Firm* — Sterne, Kessler, Goldstein & Fox P.L.L.C.

(57) ABSTRACT

One embodiment provides a media access control (MAC) module facilitating operations of an Ethernet passive optical network (EPON). The MAC module includes a frame formatter configured to generate a MAC control frame. The generated MAC control frame includes at least one of: an organizationally unique identifier (OUI) field, an OUI-specific operation code (opcode) field, and a number of fields associated with the OUI-specific opcode. Transmission of the MAC control frame facilitates realization of an EPON function based on the fields associated with the OUI-specific opcode.

28 Claims, 18 Drawing Sheets

| FIELDS | OCTETS |
|---|---|
| Destination Address (DA) | 6 |
| Source Address (SA) | 6 |
| Length/Type = 88-08 | 2 |
| Opcode | 2 |
| Timestamp | 4 |
| Opcode-specific fields/pad | 40 |
| Frame Check Sequence (FCS) | 4 |

FIG. 3A (PRIOR ART)

| FIELDS | OCTETS |
|---|---|
| Destination Address (DA) | 6 |
| Source Address (SA) | 6 |
| Length/Type = 88-08 | 2 |
| Opcode = FF-FE | 2 |
| Organizationally Unique Identifier (OUI) | 3 |
| OUI-specific Opcode | 1 |
| Timestamp | 4 |
| OUI-Opcode-specific fields | Varies |
| Frame Check Sequence (FCS) | 4 |

FIG. 3B

| FIELDS | OCTETS |
|---|---|
| DA | 6 |
| SA | 6 |
| Length/Type = 88-08 | 2 |
| Opcode = FF-FE | 2 |
| OUI = 00-0D-B6 | 3 |
| OUI-specific Opcode = 01 | 1 |
| Timestamp | 4 |
| Backpressure time for queue 0 | 2 |
| Backpressure time for queue 1 | 2 |
| Backpressure time for queue 2 | 2 |
| Backpressure time for queue 3 | 2 |
| Backpressure time for queue 4 | 2 |
| Backpressure time for queue 5 | 2 |
| Backpressure time for queue 6 | 2 |
| Backpressure time for queue 7 | 2 |
| Frame Check Sequences (FCS) | 4 |

FIG. 4

| FIELDS | OCTETS |
|---|---|
| DA | 6 |
| Source Address (SA) | 6 |
| Length/Type = 88-08 | 2 |
| Opcode = FF-FE | 2 |
| OUI = 00-0D-B6 | 3 |
| OUI-specific Opcode = 07 | 1 |
| Timestamp | 4 |
| Tx Shutdown Time | 2 |
| Rx Shutdown Time | 2 |
| Frame Check Sequence (FCS) | 4 |

FIG. 5

| FIELDS | OCTETS |
|---|---|
| DA | 6 |
| Source Address (SA) | 6 |
| Length/Type = 88-08 | 2 |
| Opcode = FF-FE | 2 |
| OUI = 00-0D-B6 | 3 |
| OUI-specific Opcode = 08 | 1 |
| Timestamp | 4 |
| Number of Queue Sets | 1 |
| Queue Set 0 Bitmap | 2 |
| Queue Set 0 Queue 0 Threshold | 0/2 |
| Queue Set 0 Queue 1 Threshold | 0/2 |
| Queue Set 0 Queue 2 Threshold | 0/2 |
| Queue Set 0 Queue 3 Threshold | 0/2 |
| Queue Set 0 Queue 4 Threshold | 0/2 |
| Queue Set 0 Queue 5 Threshold | 0/2 |
| Queue Set 0 Queue 6 Threshold | 0/2 |
| Queue Set 0 Queue 7 Threshold | 0/2 |
| Frame Check Sequence (FCS) | 4 |

Repeat *n* times as indicated by *Number of queue sets*

FIG. 6

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 0A | 1 |
| Timestamp | 4 |
| Length of TOD data | 1 |
| TOD Value | Varies |
| Correlation ID | 2 |
| Frame Check Sequence (FCS) | 4 |

FIG. 7B

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 09 | 1 |
| Timestamp | 4 |
| Clock Interval | 4 |
| Next Edge Time | 4 |
| Sequence Number | 2 |
| Frame Check Sequence (FCS) | 4 |

FIG. 7A

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 0B | 1 |
| Timestamp | 4 |
| Switch Time | 4 |
| Key Number | 1 |
| Key Length | 1 |
| Key | Varies |
| Frame Check Sequence (FCS) | 4 |

FIG. 8

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 0C | 1 |
| Timestamp | 4 |
| Flags | 1 |
| Multicast LLID value | 2 |
| Unicast LLID value | 2 |
| Frame Check Sequence (FCS) | 4 |

FIG. 9

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 02 | 1 |
| Timestamp | 4 |
| Number of Grants/Flags | 1 |
| Grant #1 Length | 2 |
| Grant #1 Start Time | 4 |
| Sync Time | 2 |
| T_on | 1 |
| T_off | 1 |
| Grant Units | 2 |
| Frame Check Sequence (FCS) | 4 |

Repeat *n* times as indicated by *Number of Grants* (applies to Grant #1 Length and Grant #1 Start Time)

FIG. 10A

FIELDS

| Field | Size |
|---|---|
| Destination Address (DA) | |
| Source Address (SA) | |
| Length/Type = 88-08 | |
| Opcode = FF-FE | |
| OUI = 00-0D-B6 | 3 |
| OUI-specific Opcode = 02 | 1 |
| Timestamp | 4 |
| Number of Grants/Flags | 1 |
| Grant #1 Bitmap | 1 |
| Grant #1 Start Time | 4 |
| Sub-slot #1:0 Length (if present) | 2 |
| Sub-slot #1:0 Length (if present) | 2 |
| … … | |
| Sub-slot #1:7 Length (if present) | 2 |
| Sync Time | 2 |
| T_on | 1 |
| T_off | 1 |
| Grant Units | 2 |
| Frame Check Sequence (FCS) | 4 |

Repeat *n* times as indicated by *Number of Grants*

FIG. 10B

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 03 | 1 |
| Timestamp | 4 |
| Number of Queue Sets | 1 |
| Report Bitmap | 1 |
| Queue #1 Report | 2 |
| ….. | |
| Queue #7 Report | 2 |
| T_on | 1 |
| T_off | 1 |
| Hierarchical Reporting Bitmap Length | 1 |
| Hierarchical Reporting Bitmap | Varies |
| Reporting Units | 2 |
| Frame Check Sequence (FCS) | 4 |

Repeat *n* times as indicated by *Number of queue sets* (brace covers Report Bitmap through Queue #7 Report)

FIG. 11

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 04 | 1 |
| Timestamp | 4 |
| Flags | 1 |
| Max Pending Grants | 1 |
| T_on | 1 |
| T_off | 1 |
| Max Multicast Links | 2 |
| Max Queue Sets | 1 |
| Queues/Queue Set | 1 |
| Frame Check Sequence (FCS) | 4 |

FIG. 12

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 05 | 1 |
| Timestamp | 4 |
| Assigned Port | 2 |
| Flags | 1 |
| Sync Time | 2 |
| Echoed Pending Grants | 1 |
| T_on | 1 |
| T_off | 1 |
| Multicast Link | 2 |
| Queue Sets | 1 |
| Number of Queue Sets | 1 |
| Queue Set 0 Bitmap | 1 |
| Queue Set 0 Queue 0 Threshold | 0/2 |
| ... ... | |
| Queue Set 0 Queue 7 Threshold | 0/2 |
| Frame Check Sequence (FCS) | 4 |

Repeat *n* times as indicated by *Number of queue sets*

FIG. 13

| FIELDS | OCTETS |
|---|---|
| Destination Address (DA) | 6 |
| Source Address (SA) | 6 |
| Length/Type = 88-08 | 2 |
| Opcode = FF-FE | 2 |
| OUI = 00-0D-B6 | 3 |
| OUI-specific Opcode = 06 | 1 |
| Timestamp | 4 |
| Flags | 1 |
| Echoed Assigned Port | 2 |
| Echoed Sync Time | 2 |
| Echoed T_on | 1 |
| Echoed T_off | 1 |
| Echoed Multicast Link | 2 |
| Frame Check Sequence (FCS) | 4 |

FIG. 14

METHODS AND APPARATUS FOR EXTENDING MAC CONTROL MESSAGE IN EPON

RELATED APPLICATION

This application claims the benefit of U.S. Provisional Application No. 61/162,188, entitled "MAC CONTROL EXTENSIONS," by inventors Lawrence Drew Davis, Glen Kramer, Jaroslaw Wojtowicz, Ryan E. Hirth, and Edward W. Boyd, filed 20 Mar. 2009.

BACKGROUND

1. Field

The present disclosure relates to the media access control (MAC) of Ethernet passive optical networks (EPONs). More specifically, the present disclosure relates to MAC control frame extensions.

2. Related Art

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and Asynchronous Transfer Mode (ATM) protocol, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1A). Note that other topologies are also possible, including ring and mesh topologies.

Transmissions within a PON are typically performed between an optical line terminal (OLT) and optical network units (ONUs). The OLT controls channel connection, management, and maintenance, and generally resides in the central office. The OLT provides an interface between the PON and a metro backbone, which can be an external network belonging to, for example, an Internet service provider (ISP) or a local exchange carrier. For EPON, such interface is an Ethernet interface. The ONU terminates the PON and presents the native service interfaces to the end users, and can reside in the customer premises and couples to the customer's network through a customer-premises equipment (CPE).

FIG. 1A illustrates a passive optical network including a central office and a number of customers coupled through optical fibers and a passive optical splitter (prior art). A passive optical splitter 102 and optical fibers couple the customers to a central office 101. Multiple splitters can also be cascaded to provide the desired split ratio and a greater geographical coverage. Passive optical splitter 102 can reside near end-user locations to minimize the initial fiber deployment costs. Central office 101 can couple to an external network 103, such as a metropolitan area network operated by an ISP. Although FIG. 1A illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs), gigabit PONs (GPONs), and wavelength division multiplexing (WDM) PONs.

FIG. 1B presents a block diagram illustrating the layered structure of a conventional EPON (prior art). The left half of FIG. 1B illustrates the layer structure of an Open System Interconnection (OSI) model including an application layer 110, a presentation layer 112, a session layer 114, a transport layer 116, a network layer 118, a data link layer 120, and a physical layer 122. The right half of FIG. 1B illustrates EPON elements residing in data link layer 120 and physical layer 122. EPON elements include a media access control (MAC) layer 128, a MAC control layer 126, a logic link control (LLC) layer 124, a reconciliation sublayer (RS) 130, medium interface 132, and physical layer (PHY) 134. MAC layer 128 defines a medium independent function responsible for transferring data to and from physical layer 122. In general, MAC layer 128 defines data encapsulation (such as framing, addressing, and error detection) and media access (such as collision detection and deferral process). MAC control layer 126 performs real-time control and manipulation of the operation of MAC layer 128.

In the example of an Ethernet PON (EPON), communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

In order to avoid collision of upstream transmissions from different ONUs, ONU transmissions are arbitrated. This arbitration can be achieved by allocating a transmission window (grant) to each ONU. An ONU defers transmission until its grant arrives. A multipoint control protocol (MPCP) specified by the IEEE802.3-2008 and IEEE 802.3av standards can be used to assign transmission time slots to ONUs, and the MPCP in an OLT is responsible for arbitrating upstream transmissions of all ONUs coupled to the same OLT. MPCP uses MAC control messages (frames), such as GATE messages and REPORT messages, to coordinate multipoint-to-point upstream transmission. REPORT messages are used by ONUs to report local queue status to the OLT. GATE messages include discovery GATE messages and normal GATE messages. Discovery GATE messages are used by the OLT during discovery mode to advertise a discovery slot for which all uninitialized ONUs may contend. Normal GATE messages are used by the OLT to grant transmission opportunities to already discovered ONUs.

Although MPCP is able to use MAC control messages to solve the problems of dynamic bandwidth allocation (DBA) for upstream transmissions, many other issues face successful EPON implementation. For example, current flow control mechanisms use a PAUSE message, which is defined by the IEEE 802.3 standard, to signal the other end of the connection to pause transmission for a certain amount of time. Such an approach cannot provide flow control on a per-service (per-queue) basis because the PAUSE frame stops all transmission originating from a physical port. In addition to per-queue flow control, it is desirable to provide other functions using MAC control messages, such as functions that facilitate data encryption, multicasting, laser power control, idle control, etc.

SUMMARY

One embodiment provides a media access control (MAC) module facilitating operations of an Ethernet passive optical network (EPON). The MAC module includes a frame formatter configured to generate a MAC control frame. The generated MAC control frame includes at least one of: an organizationally unique identifier (OUI) field, an OUI-specific operation code (opcode) field, and a number of fields associated with the OUI-specific opcode. Transmission of the MAC control frame facilitates realization of an EPON function based on the fields associated with the OUI-specific opcode.

In a variation on this embodiment, the EPON function is one of: per-queue-based backpressure flow control, remote laser power control, setting thresholds for multipoint control protocol (MPCP) REPORT, phase-synchronized clock transport, transport of time-of-day (TOD) information, MAC layer data encryption, multicast registration, and idle control.

In a further variation, the per-queue-based backpressure flow control is realized by specifying a backpressure time value for an individual queue.

In a further variation, the remote laser power control is realized by specifying a laser shutdown time for a transmitter and/or a receiver.

In a further variation, setting thresholds for MPCP REPORT is realized by specifying a threshold value for an individual queue in a queue set.

In a further variation, phase-synchronized clock transport is realized by specifying a clock interval and an MPCP time for a next edge of the clock.

In a further variation, facilitating MAC layer data encryption includes at least one of: passing a new key and marking a time for key switching.

In a further variation, multicast registration is realized by specifying a multicast Logical Link Identifier (LLID) and a unicast LLID.

In a variation on this embodiment, the MAC control frame is an extension of an MPCP MAC control frame.

In a further variation on this embodiment, the MAC control frame is an extension of MPCP GATE, and the extended GATE frame facilitates assigning transmission slots for an individual queue.

In a further variation, the extended GATE frame allows assigning transmission slots with varying granularities.

In a further variation, the MAC control frame is an extension of MPCP REPORT, and the extended REPORT frame allows reporting queue lengths with varying granularities.

In a further variation, the MAC control frame is an extension of MPCP REGISTER_REQ, and the extended REGISTER_REQ frame reports laser turn on and turn off times of an optical network unit (ONU).

In a further variation, the MAC control frame is an extension of MPCP REGISTER, wherein the extended MAC_REGISTER allows multicast registration, and wherein the extended MAC_REGISTER sets threshold values for an individual queue in a queue set.

In a further variation, the MAC control frame is an extension of MPCP REGISTER_ACK.

BRIEF DESCRIPTION OF THE FIGURES

FIG. 3A presents a diagram illustrating the format of a generic conventional MAC control frame (prior art).

FIG. 3B presents a diagram illustrating the format of a generic MAC control frame extension in accordance with an embodiment of the present invention.

FIG. 4 presents a diagram illustrating the format of an exemplary BACKPRESSURE MAC control frame in accordance with an embodiment of the present invention.

FIG. 5 presents a diagram illustrating the format of an exemplary laser-power-control frame in accordance with an embodiment of the present invention.

FIG. 6 presents a diagram illustrating the format of an exemplary MAC control frame for setting queue report threshold in accordance with an embodiment of the present invention.

FIG. 7A presents a diagram illustrating a MAC control frame facilitating EPON clock transport in accordance with an embodiment of the present invention.

FIG. 7B presents a diagram illustrating the format of an exemplary TOD MAC control frame in accordance with an embodiment of the present invention.

FIG. 8 presents a diagram illustrating the format of an exemplary ENCRYPTION MAC control frame in accordance with an embodiment of the present invention.

FIG. 9 presents a diagram illustrating the format of an exemplary MULTICAST MAC control frame in accordance with an embodiment of the present invention.

FIG. 10A provides a diagram illustrating the format of an exemplary extended GATE MAC control frame in accordance with an embodiment of the present invention.

FIG. 10B presents a diagram illustrating the format of an exemplary extended GATE MAC control frame that assigns sub-slots to individual queues in accordance with an embodiment of the present invention.

FIG. 11 presents a diagram illustrating the format of an exemplary extended REPORT MAC control frame in accordance with an embodiment of the present invention.

FIG. 12 presents a diagram illustrating the format of an exemplary extended REGISTER_REQ MAC control frame in accordance with an embodiment of the present invention.

FIG. 13 presents a diagram illustrating the format of an exemplary extended REGISTER MAC control frame in accordance with an embodiment of the present invention.

FIG. 14 presents a diagram illustrating the format of an exemplary extended REGISTER_ACK MAC control frame in accordance with an embodiment of the present invention.

In the figures, like reference numerals refer to the same figure elements.

Table 1 illustrates a list of exemplary OUI-specific opcodes (in hexadecimal format) and the corresponding functions in accordance with an embodiment of the present invention.

Table 2 illustrates an exemplary granularity assignment based on the pre-set REPORT threshold and the resulting maximum grant duration.

Table 3 lists the values of the two highest bits in the grant-length field and corresponding grant-length granularities in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

Overview

Embodiments of the present invention provide a system for extending media access control (MAC) control frames. During operation, the system utilizes a number of MAC-control-extension frames that include a standard MAC control header, a MAC control extension opcode, an organizationally unique identifier (OUI), an OUI-specific opcode, and a number of OUI-opcode specific fields. The MAC-control-extension frames can be exchanged between an OLT and a number of downstream ONUs to facilitate additional EPON functionalities, including per-queue based backpressure flow control, remote laser power control, setting threshold for queue report, clock transport, MAC layer data encryption, multicast registration, and IDLE control. Conventional MPCP MAC control messages, such as GATE and REPORT, are also extended to allow per-queue-based scheduling.

MAC Module

Figure 1A:
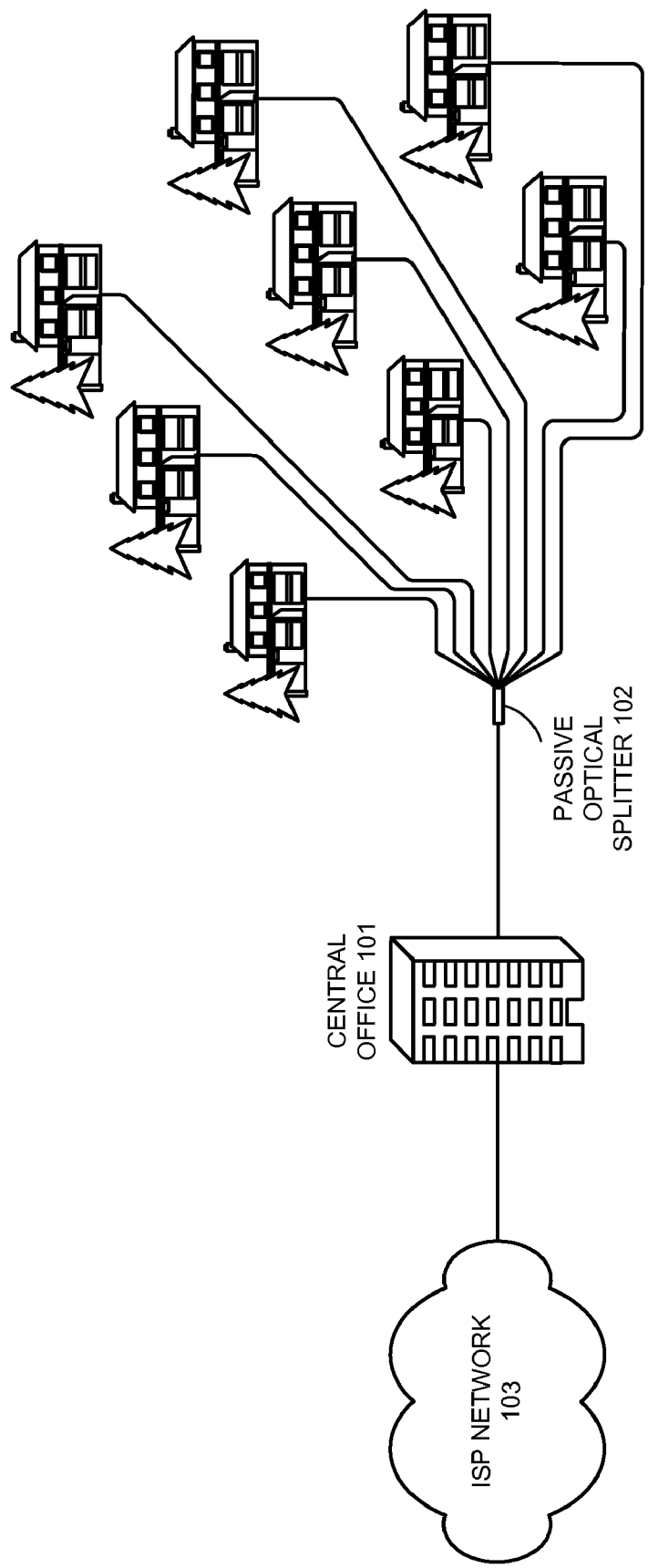
FIG. 1A illustrates a passive optical network including a central office and a number of customers coupled through optical fibers and a passive optical splitter (prior art).
Figure 1B:
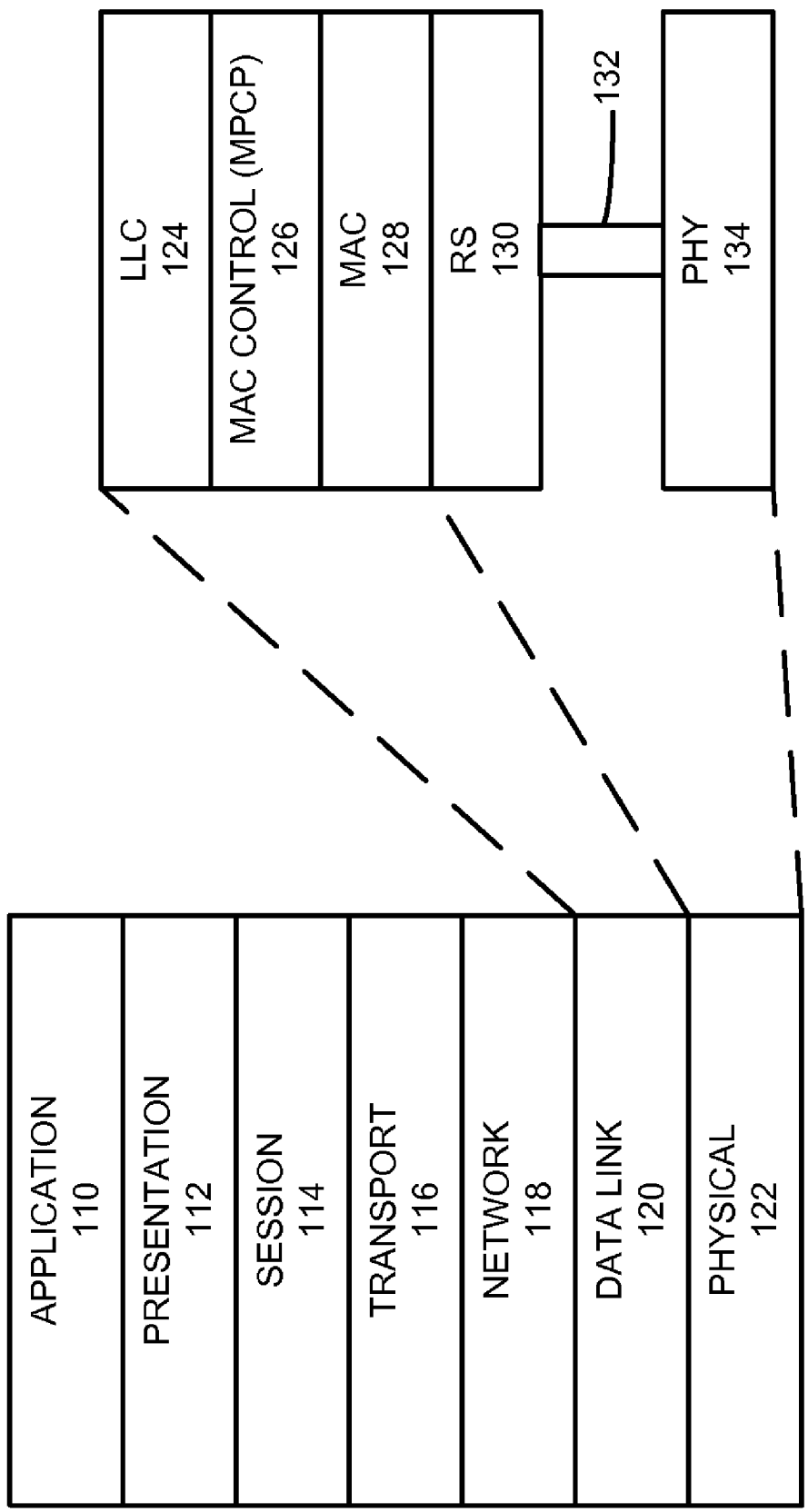
FIG. 1B presents a block diagram illustrating the layered structure of a conventional EPON (prior art).
Figure 2A:
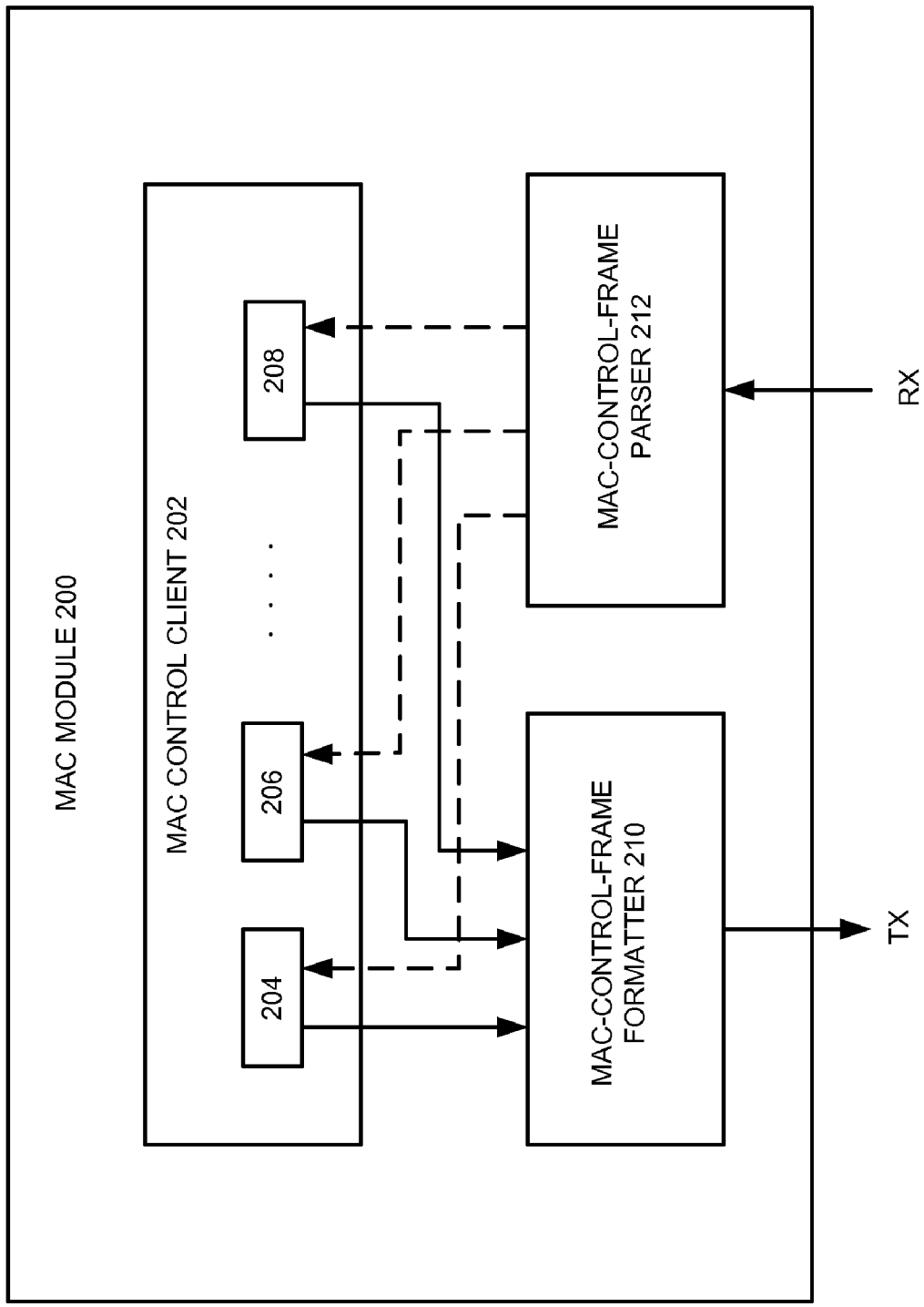
FIG. 2A presents a diagram illustrating the architecture of an exemplary MAC module in accordance with an embodiment of the present invention.

FIG. 2A presents a diagram illustrating the architecture of an exemplary MAC module in accordance with an embodiment of the present invention. MAC module 200 includes a MAC control client 202, a MAC-control-frame formatter 210, and a MAC-control-frame parser 212. MAC control client 202 includes a number of agents, such as DBA agent 204, flow-control agent 206, and encryption agent 208. These agents are configured to perform different EPON functions. For example, DBA agent 204 is configured to schedule upstream transmissions from ONUs to the OLT. Similarly, flow-control agent 206 is configured to perform flow control functions. In one embodiment, flow-control agent 206 is configured to perform flow control on a per-queue basis. Encryption agent 208 is configured to facilitate the MAC layer encryption by performing key exchanges. In one embodiment, MAC module 200 also includes other MAC control agents, including a laser-power-control agent, a clock-transport agent, an agent for setting thresholds for queue report, a multicast-registration agent, and an IDLE-control agent, etc. MAC module 200 is located at both the OLT and the ONU, hence facilitating MAC control message exchange between the OLT and the ONU. In one embodiment, MAC module 200 can be part of an ONU or OLT chip. In a further embodiment, MAC module 200 is located off chip.

During operation, agents 204 to 208 instruct MAC-control-frame formatter 210 to generate corresponding MAC control frames, which are then sent to the transmitter for transmission. For example, DBA agent 204 can instruct MAC-control-frame formatter 210 to generate MAC control frames used for transmission scheduling, including GATE, REPORT, REGISTER_REQ, REGISTER, and REGISTER_ACK. In one embodiment, MAC-control-frame formatter 210 inserts different opcodes into different MAC control frames based on the function performed by a given MAC control frame. On the other hand, MAC-control-frame parser 212 parses MAC control frames received from the receiver. After examining the opcode of a received MAC control frame, MAC-control-frame parser 212 forwards the received MAC control frame to a corresponding agent. For example, if the opcode of a received MAC control frame indicates that the MAC frame is a GATE, MAC-control-frame parser 212 can forward the GATE message to DBA agent 204 for further processing.

Figure 2B:
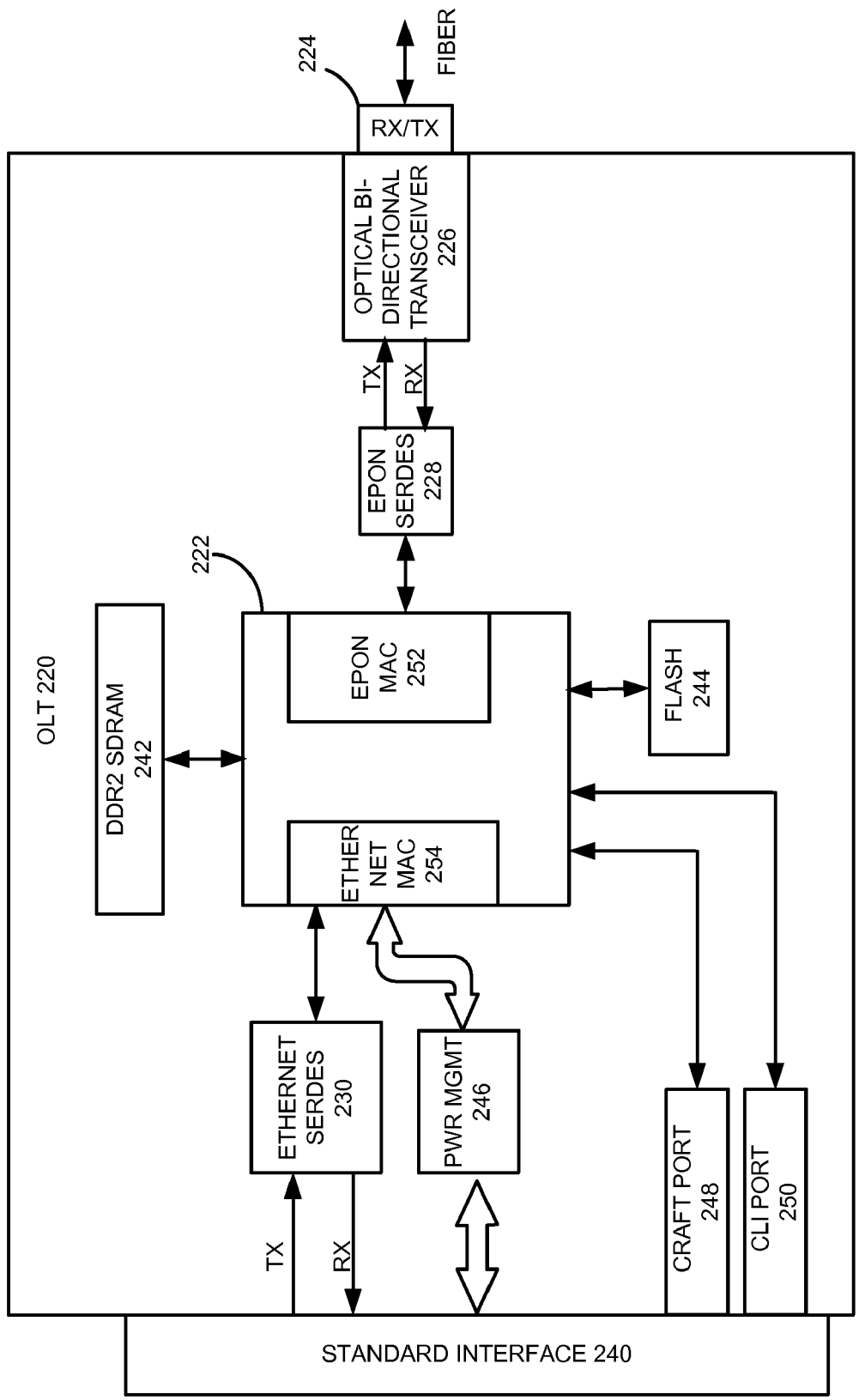
FIG. 2B presents a diagram illustrating the architecture of an exemplary OLT in accordance with an embodiment of the present invention.

FIG. 2B presents a diagram illustrating the architecture of an exemplary OLT in accordance with an embodiment of the present invention. OLT 220 includes an OLT chip 222, a fiber connector 224 for coupling to optical fibers on the plant side, i.e., the EPON fibers. Through connector 224, optical bi-directional transceiver 226 transmits optical signals to and receives signals from the optical fibers. Optical transceiver 226 is further coupled to an EPON serializer/deserializer (SERDES) 228, through a transmission (TX) link and a receiving (RX) link. In the upstream direction, EPON SERDES 228 deserializes the PON signals received by optical transceiver 226 before sending the deserialized signals to an OLT chip 222 for processing. OLT chip 222 includes an EPON MAC module 252 interfacing with the downstream PON, and an Ethernet MAC module 254 interfacing with the carrier's network. EPON SERDES 228 couples to EPON MAC module 252.

OLT 220 also includes an Ethernet SERDES 230, which provides a high-speed serial interface between OLT chip 222 and the carrier's network. In the downstream direction, Ethernet SERDES 230 deserializes network signals received from the carrier's network before sending the deserialized network signals to OLT chip 222 for processing. Ethernet SERDES 230 is coupled to Ethernet MAC module 254. OLT 220 includes an interface 240 in compliance with an interface standard to interface with the Ethernet line card.

Also included in OLT 220 are a synchronous dynamic random access memory (SDRAM) 242, a flash memory 244, a power management module 246, a craft port 248, and a command line interface (CLI) port 250. DDR2 SDRAM 242 is coupled to a FIFO buffer located on OLT chip 222, thus extending the packet buffering capacity of the FIFO buffer in both the upstream and downstream directions. Flash memory 224 is coupled to the management interface of OLT chip 222, and supports the network management and control operation of the embedded processor. Power management module 246 draws power from standard interface 240 and provides power for the rest of OLT 220, including OLT chip 222. Craft port 248 and CLI port 250 are both coupled to the management interface of OLT chip 222, thus enabling various user management functionalities, including remote out-of-band management by a network administrator.

Figure 2C:
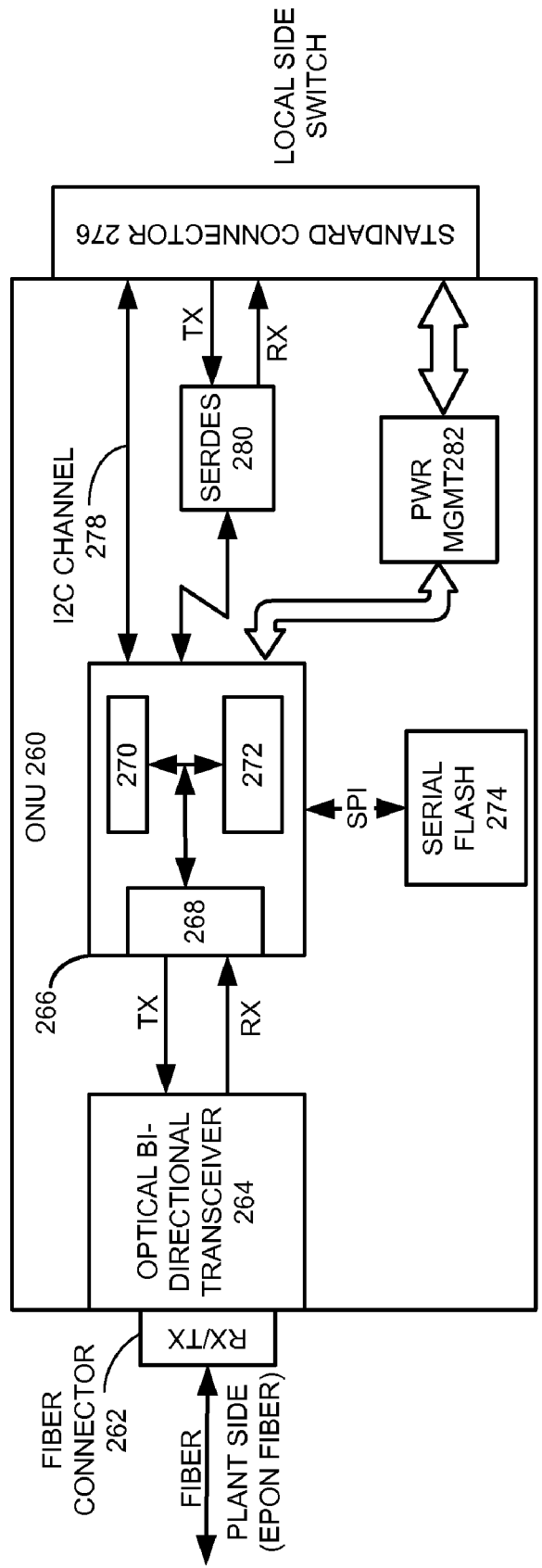
FIG. 2C presents a diagram illustrating an ONU in accordance with an embodiment of the present invention.

FIG. 2C presents a diagram illustrating an ONU in accordance with an embodiment of the present invention. ONU 260 includes a fiber connector 262 for coupling to an optical fiber on the plant side, i.e., the EPON fiber. Through connector 262, an optical bi-directional transceiver 264 transmits optical signals to and receives signals from the optical fiber. Transceiver 264 is further in communication with an ONU chip 266, through a transmission (TX) link and a receiving (RX) link. ONU chip 266 includes an EPON MAC module 268, a memory 270, and a processor 272. ONU chip 266 performs the main ONU functions, such as extracting data designated for the local subscriber based on each packet's LLID and transmission scheduling for upstream data.

Also included in ONU 260 is a flash memory 274 which is coupled to ONU chip 266 through a Serial Peripheral Interface (SPI). Serial flash memory 274 stores the programs and the initial boot-up configurations, which are loaded by ONU chip 266 upon power-up. Note that the content within flash memory 274 can be updated by the OLT through an in-band control and management channel. Hence, the ONU can perform network management based on the information sent by the OLT. On the local side of ONU 260 is a standard connector 276, which provides serial communication channels with the local subscriber's switch. A SERDES 280 couples connector 276 to ONU chip 266, converts the parallel data from ONU chip 266 to serial data for serial connector 276, and vice versa. ONU 260 further includes a power management module 282, which draws power from serial connector 276 and provides power to the rest of ONU 260, including ONU chip 266. In a further embodiment, ONU chip 266 can include SERDES 280, thereby further reducing the footprint of the ONU module. ONU 260 can also include an Inter-Integrated Circuit (I2C) bus 278 coupled between serial connector 276 and ONU chip 266. The I2C bus allows the local switch to send control and management information to ONU chip 266 and to manage ONU 260.

MAC Control Frame Extension

FIG. 3A presents a diagram illustrating the format of a generic conventional MAC control frame (prior art). Conventional MAC control frames have a fixed length of 64 bytes, including a 6-byte destination address (DA) field, a 6-byte source address (SA) field, a 2-byte length/type field, a 2-byte operation code (opcode) field, a 4-byte timestamp field, 40-byte opcode-specific fields, and a 4-byte frame check sequence (FCS) field.

The DA field includes the address of the stations for which the frame is intended. MPCP defines a globally assigned multicast address 01-80-C2-00-00-01 for all MPCP messages with the exception of the REGISTER frames, which use the individual MAC address of the destination ONU. The SA field includes the individual address of the station sending the frame. The length/type filed has a hexadecimal value 88-08, which has been universally assigned to identify the MAC control frame. The opcode field identifies the specific MAC control frames. For example, 00-01 indicates the MAC control frame is a PAUSE frame, whereas 00-02 indicates the MAC control frame is a GATE frame.

The timestamp field carries the value of the MPCP clock corresponding to the transmission of the first byte of the DA. The timestamp values are used to synchronize MPCP clocks in the OLT and ONUs. Opcode-specific fields carry information pertinent to specific functions identified by the opcode. The portion of the payload not used by the opcode-specific fields is padded with zeros to guarantee the fixed MAC frame length. The FCS field carries a 32-bit cyclic redundancy check (CRC32) value used by the MAC to verify the integrity of received frames.

As previously discussed, conventional MAC control frames are limited in addressing various control issues facing EPON, including per-queue flow control, MAC layer data encryption, laser power control, etc. To address these issues, embodiments of the present invention implement MAC control frame extensions. These extensions can be specified by an organizationally unique identifier (OUI) and opcodes associated with a particular organization or OUI.

FIG. 3B presents a diagram illustrating the format of a generic MAC control frame extension in accordance with an embodiment of the present invention. The MAC control frame extension shown in FIG. 3B includes the standard MAC control header, including the DA field (with either a globally assigned multicast address of 01-80-C2-00-00-03 or a unicast MAC address), the SA field, and the length/type field, followed by an opcode with a value of FF-FE, indicating the MAC control frame is an extension. A 3-byte OUI field identifies a specific organization associated with the extension. Note that OUIs are assigned to vendors by the Institute of Electrical and Electronics Engineers, Incorporated (IEEE) Registration Authority. Following the OUI field is a 1-byte organizationally specific opcode field (OUI-specific opcode), which is defined by the organization. Different opcodes specify different MAC control frame extensions pertinent to different EPON functions. Table 1 illustrates a list of exemplary OUI-specific opcodes (in hexadecimal format) and the corresponding functions in accordance with an embodiment of the present invention. In addition to the functions listed in Table 1, other functions are also possible.

TABLE 1

| OUI-Specific OPCODE VALUE | FUNCTION |
| --- | --- |
| 01 | Backpressure Flow Control |
| 02 | Extended MPCP GATE |
| 03 | Extended MPCP REPORT |
| 04 | Extended MPCP REGISTER_REQ |
| 05 | Extended MPCP REGISTER |
| 06 | Extended MPCP REGISTER_ACK |
| 07 | Laser Power Control |
| 08 | Setting Queue Threshold for Report |
| 09 | Transporting Phase Reference for Clock Transport |
| 0A | Transporting Time-of-Day (TOD) |
| 0B | MAC Encryption Related Functions |
| 0C | Multicasting Registration |
| 0D | IDLE Control |

FIG. 4 presents a diagram illustrating the format of an exemplary BACKPRESSURE MAC control frame in accordance with an embodiment of the present invention. In FIG. 4, the OUI-specific opcode has a value of 01, indicating the MAC frame is a BACKPRESSURE MAC frame for flow control. In the BACKPRESSURE frame, the OUI-opcode specific fields include a number of 2-byte backpressure time fields; each specifies a value that sets a backpressure timer for a corresponding queue, including backpressure time for queue 0 up to backpressure time for queue 7. In one embodiment, the unit for the backpressure time is 512-bit periods at 10 Gbps line rate or 32 time quanta (TQ). Note that the TQ is defined to be a 16-ns interval. Allowing the setting of individual backpressure times for individual queues makes it possible to implement flow control on a per-queue (per-service) basis. This is advantageous when more than one priority queue is implemented in an EPON to buffer traffic of different priority classes.

During operation, in response to receiving a BACKPRESSURE frame, an ONU sets a number of timers associated with individual queues based on corresponding backpressure time fields. Data from a backpressured queue (a queue with a nonzero backpressure timer) will not be reported or transmitted until the backpressure timer expires. If some data frames have been reported to the OLT, they will be transmitted as usual. If a BACKPRESSURE frame is received while a backpressure timer is already running, that backpressure timer is set to the new value specified by the received frame. Accordingly, a value of zero for a running timer resets the timer, hence canceling any existing backpressure for that queue, and allows transmission to resume. Note that BACKPRESSURE control frames can be sent on any segment or link in either direction. For example, a BACKPRESSURE frame can be sent from the OLT to an ONU, from a downstream switch to an ONU, or from an ONU to the OLT.

FIG. 5 presents a diagram illustrating the format of an exemplary laser-power-control frame in accordance with an embodiment of the present invention. In FIG. 5, the OUI-specific opcode has a value of 07, indicating the MAC frame is a LASER-CONTROL MAC frame. Sending a LASER-CONTROL frame to a downstream ONU allows an OLT to remotely control the ONU's transmitting and possibly receiving power. Power can be conserved by shutting down the ONU's transmitter during relatively lengthy intervals, during which there is no data to exchange with the OLT. In addition, the ability to control the ONU's laser power remotely can be useful for diagnosing faulty ONUs, and for disabling a failed ONU once it is isolated.

The OUI-opcode specific fields for the LASER-CONTROL message include a 2-byte transmitter (TX) shutdown time field and a 2-byte receiver (RX) shutdown time field. The value of the TX shutdown time sets a TX-shutdown timer, and the value of the RX shutdown time sets an RX-shutdown timer. The ONU's TX and RX remain powered up until their corresponding shutdown timers expire. In one embodiment, the unit for TX and RX shutdown times is ms. Note that not all ONUs have separate TX and RX power supplies. In such cases, the ONU is configured to shut down its RX according to the value of the TX shutdown time, and the RX shutdown time is ignored. In addition to turning off transmitters and receivers, the ONU can optionally turn off other hardware that requires power, such as SERDES, when the ONU is inactive to further reduce power consumption.

If a new LASER-CONTROL frame is received while shutdown timers are running, the shutdown timers are reset to the corresponding values included in the received LASER-CONTROL frame. Two special shutdown time values exist. One is the value of 0, which is used to instruct the ONU to resume power immediately. The other one is the value of FF-FF, which instructs the ONU to suspend power to the corresponding TX or RX indefinitely unless or until the OLT sends a cancel message with a 0 value. To ensure proper operations, the ONU needs to retain the TX and RX shutdown timer values in non-volatile memories. In cases where an ONU resets while its TX or RX shutdown timer is running, the ONU will set the timer to the saved value after the reset.

FIG. 6 presents a diagram illustrating the format of an exemplary MAC control frame for setting thresholds for queue report in accordance with an embodiment of the present invention. In FIG. 6, the OUI-specific opcode has a value of 08, indicating the MAC frame is a REPORT-THRESHOLD frame.

The IEEE 802.3 standard allows a REPORT message to convey queue lengths of up to 8 queues to the OLT. Each REPORT message includes multiple queue sets, and each queue set reports a cumulative length of a subset of queued packets, always starting from the head of the queue. Allowing the ONU to report queue lengths in sets of different lengths makes it possible for the OLT to grant time slots with length equal to any reported value, thus avoiding waste of bandwidth. To facilitate determining the length of each packet subset, MPCP protocol defines multiple thresholds for each queue, and the reported queue length of a queue set should be equal to the length of all packets not exceeding a corresponding threshold. However, the IEEE 802.3 standard does not address the issue of how to set the values of these thresholds.

In embodiments of the present invention, the OLT can send a REPORT-THRESHOLD MAC control frame to an ONU to instruct the ONU the number of queue sets allowed in the REPORT message as well as the specified thresholds for the queue report. In FIG. 6, the OUI-opcode specific fields include a 1-byte field for the number of queue sets, which tells the ONU how many queue sets to provide in a REPORT message. For each queue set, there is a 2-byte queue bitmap indicating which queue reports are present in the queue set. For each present queue, a threshold is specified in the corresponding 2-byte threshold field. Note that, if a queue is not included in the report, the corresponding field for setting its threshold is omitted from the REPORT-THRESHOLD frame.

FIG. 7A presents a diagram illustrating a MAC control frame facilitating EPON clock transport in accordance with an embodiment of the present invention. Clock transport is important in EPONs because it allows an EPON to transport TDM-based traffic, hence making it possible to implement EPONs in a mobile backhaul network. To facilitate transporting a phase-synchronized clock signal, the OLT can transmit a timestamp that defines a difference between the input clock and the downstream line clock. In one embodiment of the present invention, such timestamp is transmitted by a PHASE-REFERENCE MAC control frame as shown in FIG. 7A. The OUI-specific opcode for such a PHASE-REFERENCE MAC frame is set as 09. The OUI-opcode specific fields include a 4-byte clock-interval field, a 4-byte next-edge-time field, and a 2-byte sequence-number field.

The clock-interval field specifies the nominal length of the clock interval in the unit of TQ for a clock. For example, if the clock interval is set as 1 second (clock rate of 1 Hz), then the clock-interval field will have a value of 62,500,000 The transmission of the clock interval ensures the frequency synchronization between the OLT clock and the local clock on an ONU. To make sure that the ONU clock is also phase-synchronized with the OLT clock, the 4-byte next-edge-time field specifies the MPCP time of the next clock edge. In one embodiment, the next-edge-time field specifies the MPCP time of the falling edge of the next clock. Therefore, upon receiving the PHASE-REFERENCE MAC control frame, the ONU can phase lock its local clock to make sure its next falling edge occurs at the MPCP time as specified by the next-edge-time field. In one embodiment of the present invention, to ensure synchronization, the PHASE-REFERENCE MAC control frame is transmitted from the OLT to the ONU multiple times per clock interval. The sequence number specifies the sequential position of the next falling edge. If multiple PHASE-REFERENCE MAC control frames are sent during a same clock interval, they share the same sequence number.

In addition to a synchronized clock, in embodiments of the present invention, the OLT can also transmit the time-of-day (TOD) information to downstream ONUs using a TOD MAC control frame. FIG. 7B presents a diagram illustrating the format of an exemplary TOD MAC control frame in accordance with an embodiment of the present invention. The OUI-specific opcode for the TOD MAC control frame is set as 0A. The OUI-opcode specific fields include a 1-byte lengthof-TOD field, indicating the byte length of the TOD data. Embodiments of the present invention allow the TOD data to have any type of text or binary format, such as a data format specified by National Marine Electronics Association (NMEA) 0183 standard. Following the length-of-TOD field is a TOD-value field with a variable length and a 2-byte correlation-ID field. The TOD-value field specifies the TOD value for the next clock falling edge. The correlation ID correlates each TOD frame with a corresponding PHASE-REFERENCE frame, which specifies the MPCP time for the next clock falling edge. Upon receiving a TOD frame, the ONU checks whether the correlation ID of the TOD frame matches the sequence number of the most recent PHASE-REFERENCE frame. If so, the TOD field within the TOD MAC control frame specifies the TOD value of the MPCP time for the next clock falling edge. If not, the corresponding PHASE-REFERENCE frame may be lost, and the ONU may ignore the current TOD frame, and wait for a next one.

FIG. 8 presents a diagram illustrating the format of an exemplary ENCRYPTION MAC control frame in accordance with an embodiment of the present invention. In FIG. 8, the OUI-specific opcode for the ENCRYPTION MAC control frame is 0B. The ENCRYPTION MAC control frame can be used to exchange encryption keys, and to synchronize key switchover for MAC layer data encryption. The OUI-opcode specific fields include a 4-byte switch-time field, a 1-byte key-number field, a 1-byte key length field, and a variable-length key-value field.

The switch-time field specifies the proposed key switch time (in MPCP time) for key exchange protocols that use synchronized time to switch. If other key exchange protocols are used, this field is treated as reserved, and is set to zero. If the MPCP time indicated in the switch-time field is in the middle of a frame, the key switch will occur at the start of the next frame. The key-number field indicates which key among a number of keys has the new value, which is included in the following key-value field. Note that to support a hitless switch at least two key phases are needed. In one embodiment, the system implements more than two phases, and each key phase is assigned a key number. The key-length field specifies the number of bytes of the key. For example, for an advance encryption system (AES) with 128-bit keys, the key-length field is set as 16. The key-value field is the randomly generated key with a length as specified by the key-length field.

In addition to facilitating key exchange, embodiments of the present invention also use the ENCRYPTION MAC control frame to mark key phase transitions. In one embodiment, an ENCRYPTION frame can be used as a key-switch marker, which indicates that this frame is the last frame sent by the transmitter using the current key phase, and subsequent frames are encrypted with a different key. When used as a key-switch marker, the switch-time field of the ENCRYPTION frame is set to the current MPCP time, implying that a key switch will occur as soon as this frame ends. The key-number field is set to indicate the next key phase. The Key-length field is set as zero, and no key-value field is included in the key-switch marker frame. Note that, other than using the key-switch marker frames to mark the key switch time, it is also possible for the OLT and the ONU to agree on a particular MPCP time in the future at which the key is to be switched. In addition, the system can also use a reserved bit in the preamble or other fields of a transmitted frame to indicate the key used to encrypt the frame. Special values in some fields can indicate the key phase. For example, the CRC8 field in the preamble can be used to indicate key phase. An uninverted CRC8 represents a key phase, whereas an inverted CRC8 represents a different key phase. Although this approach slightly reduces error protection, it avoids the need to use reserved bits.

Encryption keys for a link can be generated at either the OLT or the ONU. For unicast links, keys can be generated at the ONU and transmitted to the OLT using the relatively secure upstream link. For multicast links, because all ONUs belonging to a same multicast group share the same key, the OLT often generates the key, and distributes it to the ONUs. It is also possible for ONUs within a multicast group to submit keys to the OLT, which in turn selects one, and redistributes it downstream.

An EPON can be subdivided into multiple logical networks by using additional multicast LLIDs other than just one global broadcast LLID (which has a value of 7FFF). During EPON operation, a multicast LLID acts just like the broadcast LLID, except that the multicast LLID value has been assigned only to a subset of ONUs on the PON. Such a feature allows independent encryption and rate control for different services, providers, and other such distinctions useful in a carrier-grade multiple-service network. Embodiments of the present invention allow an ONU to register and deregister to a multicast group. FIG. 9 presents a diagram illustrating the format of an exemplary MULTICAST MAC control frame in accordance with an embodiment of the present invention. The OUI-specific opcode for the MULTICAST frame is set as 0C. The OUI-opcode specific fields include a 1-byte flag field, a 2-byte multicast-LLID field, and a 2-byte unicast-LLID field.

The flag field indicates the purpose of the MULTICAST frame, which can either be sent from an OLT to an ONU for registration/deregistration or can be sent from an ONU to an OLT as a registration response. If the FLAG field is set as 1, the MULTICAST frame is a frame sent from an OLT to the ONU for registering and reregistering of a multicast group. Such operation associates a multicast LLID (as specified by the multicast-LLID field) with a unicast LLID (as specified by the unicast-LLID field). The unicast LLID has been previously assigned during the standard MPCP registration process. Note that the default multicast LLID for a unicast link is the standard broadcast LLID 7FFF. In other words, links always conduct registration on 7FFF. If the flag field is set as 2, the MULTICAST frame is a frame sent by an OLT to an ONU to de-associate a multicast LLID (as specified by the multicast-LLID field) with a unicast LLID (as specified by the unicast-LLID field), which is again associated with the broadcast LLID 7FFF.

If the flag field is set as 3, the MULTICAST frame is a frame returned by the ONU to acknowledge successful receipt of the multicast registration frame. On the other hand, a value of 4 in the flag field indicates that the ONU fails to complete the multicast LLID assignment. In addition to having the OLT assign multicast LLIDs to ONUs, in one embodiment, the ONU can send a multicast request message to the OLT to elicit a multicast registration message for the link. Note that a unicast LLID may be associated with more than one multicast link, either via multiple registration messages or by a message including a list of multicast LLIDs. Conversely, a single multicast LLID can be assigned to multiple unicast LLIDS.

Additional functions that can be realized using the MAC control extensions include a function that performs IDLE control. In an ONU's upstream path (electrical domain between SERDES output and the laser input), there is often capability to not only transmit upstream data during grant times, but also to generate IDLE characters between grants. Although these IDLEs are seen by the laser input buffers, they are not emitted upstream as they are gated by the "burst enable" ONU MAC signal. Generating IDLE characters between grants by the ONU SERDES allows AC coupling capacitors between the SERDES output and the laser input to stay charged, hence avoiding RC time penalty.

If an ONU that does not generate IDLEs between bursts has its laser either stuck at on or "leaking" light, it is less likely to cause issues in the network as long as the increased constant optical power level does not violate OLT receiver optical sensitivity beyond its input saturation level. In contrast, a "rogue" ONU that generates IDLEs between bursts and has its laser stuck at on or leaking light can cause issues for all other ONUs. Most likely, other ONUs will deregister while the "bad" ONU stays registered as the colliding ONUs' varying light outputs add together.

Therefore, it is important to be able to disable generations of IDLEs, especially for existing networks that lack optical monitoring hardware at the ONUs. Embodiments of the present invention provide a MAC control frame extension configured to enable/disable the generation of IDLEs between grants. In one embodiment, a MAC control frame can also be generated to read the ONU's present IDLE-generation state.

Extensions of MPCP

Embodiments of the present invention also generate extended MAC control frames that perform the same functions as conventional MPCP frames, such as GATE, REPORT, REGISTER_REQ, REGISTER, and REGISTER_ACK. In addition to the standard MPCP functions, the extended frames include additional fields to support additional functionalities.

FIG. 10A provides a diagram illustrating the format of an exemplary extended GATE MAC control frame in accordance with an embodiment of the present invention. The OUI-specific opcode for the extended GATE is set as 02 (same as the opcode for the MPCP GATE). Similar to the conventional MPCP GATE control frame, the OUI-opcode-specific fields of the extended GATE include a 1-byte number-of-grants/flag field, a pair of fields that repeat n times as indicated by the number of grants, and a 2-byte sync time field. In addition, the extended GATE includes a 1-byte T_on field, a 1-byte T_off field, and a 2-byte grant-units field.

The T_on and T_off fields specify the longest ONU turn on and turn off times of the ONU accepted by the OLT. ONUs failing to meet this requirement cannot respond to the discovery GATE. During operation, an OLT may transmit the discovery GATE with different T_on and T_off values in order to detect silent ONUs attached to the PON. For example, the OLT may occasionally elicit discovery of slow ONUs by issuing an extended GATE with increased T_on or T_off times in order to detect a REGISTER_REQ message from a slow ONU. Note that the protocol does not require the OLT to register the slow ONUs. It suffices to detect the presence of the slow ONU in order to warn the network operators that incompatible equipment is attached to the PON, without actually registering the slow ONU.

In a conventional MPCP GATE control frame, the grant-length field represents the length of the granted transmission in TQ. Such grant-size granularity may not be sufficient, especially in cases where smaller thresholds are used for REPORT. To provide better granularity, which allows grant sizes to match the queued data length more precisely, embodiments of the present invention use the grant-units field to specify the number of octet times for the grant-length granularity. For example, if the line rate is 1 Gbps, 1 TQ (16 ns) is equivalent to a value of 2, whereas if the line rate is 10 Gbps, 1 TQ is equivalent to a value of 20. Note that finer granularities may limit the maximum grant size because the grant-length field has a fixed length (16 bits). Since the reported queue length and the grant slot size ultimately depend on the pre-set REPORT threshold values, it makes sense to apply finer granularities to situations with smaller REPORT thresholds and coarser granularities to the ones with larger REPORT thresholds. Table 2 illustrates an exemplary granularity assignment based on the pre-set REPORT threshold and the resulting maximum grant duration.

TABLE 2

| THRESHOLD (in bytes) | GRANT LENGTH GRANULARITY | MAX GRANT DURATION @ 10 Gbps |
|---|---|---|
| $<2^{16} - 1$ (65535) | 1 byte | 0.05 ms |
| $2^{16}$ through $2^{17} - 1$ | 2 bytes | 0.10 ms |
| $2^{17}$ through $2^{18} - 1$ | 4 bytes | 0.21 ms |
| $2^{18}$ through $2^{19} - 1$ | 8 bytes | 0.42 ms |
| $2^{19}$ through $2^{20} - 1$ | 16 bytes | 0.84 ms |
| $2^{20}$ through $2^{21} - 1$ | 32 bytes | 1.68 ms |
| $2^{21}$ through $2^{22} - 1$ | 64 bytes | 3.36 ms |

In one embodiment of the present invention, an extended GATE frame contains only one grant-units field, which specifies the grant-length granularity for all grants within the extended GATE message. In a further embodiment, an extended GATE frame can include multiple fields reporting different grant-length granularities for the different grants within the extended GATE frame. In addition to specifying grant-length granularity in the grant-units field, in one embodiment, the grant-length granularity is exchanged/negotiated between the OLT and ONUs using a separate control frame. One more possible way of exchanging/negotiating grant-length granularity is to redefine the grant-length field by using a number of bits within the grant-length field to represent granularity, while keeping the remaining bits to represent length. For example, the highest two bits in the grant-length field can be assigned to represent the grant-length granularity, while the remaining 14 bits represent grant length. Table 3 lists the values of the two highest bits in the grant-length field and corresponding grant-length granularities in accordance with an embodiment of the present invention.

TABLE 3

| GRANT-LENGTH BITS [14:15] | GRANT-LENGTH GRANULARITY | MIN GRANT LENGTH (in bytes) | MAX GRANT LENGTH (in bytes) | MAX GRANT DURATION @ 10 Gbps |
|---|---|---|---|---|
| 00 | 2 bytes | 0 | 32768 | 0.03 ms |
| 01 | 4 bytes | 32768 | 98308 | 0.08 ms |
| 10 | 16 bytes | 98308 | 360468 | 0.29 ms |
| 11 | 64 bytes | 360468 | 1409044 | 1.13 ms |

A conventional MPCP GATE control frame assigns a transmission slot for all queues in an ONU, which makes it necessary for an ONU to apply certain types of scheduling algorithms to determine how to serve the multiple queues into a common slot. However, the OLT may assume a particular ONU scheduling method when calculating the total grant size, whereas in reality the ONU is using a different scheduling method. Such a mismatch may result in underutilized grants (due to packet boundaries different from the ones assumed by the OLT) and more importantly, may result in violation of the service level agreement (SLA). One approach to resolving such an issue is to keep both the grant calculation and packet scheduling under the control of one device. Since the OLT is the only device with global knowledge of all queues in all ONUs, it makes sense to make the OLT responsible for scheduling all the packets into the common upstream EPON channel. One way to achieve this is to employ the multiple-LLID solution, wherein each queue in each ONU is viewed as a separate virtual ONU by the OLT, thus providing individual REPORTs and receiving individual GATEs from the OLT. However, such an approach may increase burst mode overhead, since each virtual ONU (each queue) transmits a separate burst.

In order to avoid the additional burst overhead, one embodiment of the present invention allows a GATE message to carry individual sub-slots assigned to individual queues. In this way, while the entire physical ONU only uses one LLID and transmits only one burst, each individual queue is required to limit its transmission to the size of the assigned sub-slot. In addition, this approach eliminates the need for any local scheduler at the ONU. FIG. 10B presents a diagram illustrating the format of an exemplary extended GATE MAC control frame that assigns sub-slots to individual queues in accordance with an embodiment of the present invention.

Similar to the extended GATE frame, embodiments of the present invention also provide an extended REPORT MAC control frame capable of supporting a number of functionalities other than ONU reporting queue status. FIG. 11 presents a diagram illustrating the format of an exemplary extended REPORT MAC control frame in accordance with an embodiment of the present invention. The OUI-specified opcode for the extended REPORT is set as 03, same as the opcode for the MPCP REPORT message. The OUI-opcode specific fields include similar fields to those included in the conventional MPCP REPORT, such as the 1-byte number-of-queue-set field, the 2-byte report bitmap for each present queue set, and the 1-byte queue-report field for each present queue. In addition, the extended REPORT control frame includes a 1-byte T_on field, a 1-byte T_off field, a 1-byte hierarchical-reporting-bitmap-length field, a variable-length hierarchical-reporting-bitmap field, and a 2-byte report-units field.

The T_on and T_off fields indicate the observed turn on and turn off times of the ONU. These fields provide optical monitoring parameters to the OLT. The hierarchical-reporting-bitmap-length field and the hierarchical-reporting-bitmap field facilitate the reduction of polling bandwidth for idle ONUs supporting multiple LLIDs. Because an ONU may support multiple LLIDs, the OLT is required to poll each LLID periodically, hence resulting in large polling overhead, especially when some LLIDs remain idle for a long period of time. To reduce such overhead, embodiments of the present invention allow an active LLID to report the link status of its neighboring LLIDs using the hierarchical-reporting-bitmap field. Each bit for the field represents a link on the ONU. Bit 1 indicates that the corresponding link has data to send, and hence should be polled by the OLT to obtain a full REPORT message for that link. On the other hand, bit 0 indicates that the corresponding link is idle, and need not be polled. Because the number of LLIDs on an ONU can vary, the length of the bitmap is defined by the hierarchical-reporting-bitmap-length field.

Similar to the grant length, embodiments of the present invention allow the queue report to have different granularities. The queue-report granularity can be exchanged/negotiated between OLT and ONUs via a dedicated control message or via the report-units field in the extended REPORT control frame. Similar to the grant-units field in the extended GATE, the report-units field in the extended REPORT defines the granularity of the reported queue length. In one embodiment, the extended REPORT message includes a single report-units field defining granularity for all the queue-length values in the given REPORT message. In a further embodiment, the extended report message includes individual report-units fields for each queue set. In addition, it is also possible to allocate a number of bits in the queue report to represent the granularity of the reported queue length.

Additional extended MPCP MAC control frames include the extended REGISTER_REQ frame shown in FIG. 12, the extended REGISTER frame shown in FIG. 13, and the extended REGISTER_ACK frame shown in FIG. 14.

FIG. 12 presents a diagram illustrating the format of an exemplary extended REGISTER_REQ MAC control frame in accordance with an embodiment of the present invention. The OUI-specific opcode for the extended REGISTER_REQ frame is set as 04, same as the opcode for the conventional MPCP REGISTER_REQ frame. The OUI-opcode specific fields include similar fields to those contained in the conventional MPCP REGISTER_REQ frame, such as the 1-byte flags field and the 1-byte max-pending-grants field. In addition, the extended REGISTER_REQ frame also includes a 1-byte T_on field, a 1-byte T_off field, a 2-byte max-multicast-links field, a 1-byte max-queue-sets field, and a 1-byte queues/queue-sets field.

The T_on and T_off fields indicate the shortest (best case scenario) turn on and turn off times the ONU supports. The max-multicast-links field indicates the maximum number of multicast links which can be assigned to the ONU, hence the maximum capacity of the ONU. The max-queue-sets field indicates the maximum number of queue sets supported by the ONU, and the queues/queue-set field indicates the maximum queues per queue set supported by the ONU.

FIG. 13 presents a diagram illustrating the format of an exemplary extended REGISTER MAC control frame in accordance with an embodiment of the present invention. The OUI-specific opcode for the extended REGISTER frame is set as 05, same as the opcode for the conventional MPCP REGISTER frame. The OUI-opcode specific fields include similar fields to those contained in the conventional MPCP REGISTER frame, such as the 2-byte assigned-port field, the 1-byte flags field, the 2-byte sync-time field, and the 1-byte echoed-pending-grants field. In addition, the extended REGISTER frame also includes a 1-byte T_on field, a 1-byte T_off field, a 2-byte multicast-link field, a 1-byte queue-sets field, a 1-byte number-of-queue-sets field, and a group of fields that repeat n times as indicated by the number of queue sets. The group of fields include a queue-bitmap and a number of queue-report thresholds.

The T_on and T_off fields indicate the actual ONU turn on and turn off times that will be used on this particular link. The ONU assigns values that are no shorter than the ONU T_on/T_off capability reported in the extended REGISTER_REQ. In one embodiment, the OLT assigns the same T_on/T_off times to all links on the PON. In a further embodiment, the OLT assigns different T_on/T_off times to different ONUs in order to optimize performance.

The multicast-link field associates the multicast LLID with the unicast LLID (indicated by the assigned-port field) assigned to the link. Hence, no separate MULTICAST control frame is needed for the multicast registration.

Additional fields in the extended REGISTER frame facilitate the negotiation of the report format between the OLT and the ONU. The queue-sets field indicates the number of queue sets to use, and the number-of-queue-sets field indicates the number of queue sets to be used in the report. The queue-report-threshold field for a particular queue in a particular queue set specifies the threshold to be used in the REPORT for that queue. The number of queues per queue set is determined by the number of bits set in the bitmap.

FIG. 14 presents a diagram illustrating the format of an exemplary extended REGISTER_ACK MAC control frame in accordance with an embodiment of the present invention. The OUI-specific opcode for the extended REGISTER_ACK frame is set as 06, same as the opcode for the conventional MPCP REGISTER_ACK frame. The OUI-opcode specific fields include similar fields contained in the conventional MPCP REGISTER_ACK frame, such as the 1-byte flags field, the 2-byte echoed-assigned-port field, and the 2-byte echoed-sync-time field. In addition, the extended REGISTER_ACK MAC control frame includes echoed fields corresponding to those contained in the extended REGISTER control frame, such as a 1-byte echoed-T_on field, a 1-byte echoed-T_off field, and a two-byte echoed-multicast-link.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A media access control (MAC) module, comprising:
 a frame formatter configured to generate a MAC control frame, the MAC control frame including:
  an organizationally unique identifier (OUI) field;
  an OUI-specific operation code (opcode) field; and
  a data field corresponding to the OUI-specific opcode field; and
 a MAC control client configured to facilitate an Ethernet Passive Optical Network (EPON) function based on the data field, the EPON function including a phase-synchronized clock transport realized by specifying a clock interval and a multipoint control protocol (MPCP) time for a next edge of a clock.

2. The MAC module of claim 1, wherein the EPON function further includes at least one selected from a group consisting of:
 per-queue-based backpressure flow control;
 remote laser power control;
 setting thresholds for multipoint control protocol (MPCP) REPORT;
 transport of time-of-day (TOD) information;
 MAC layer data encryption;
 multicast registration; and
 idle control.

3. The MAC module of claim 2, wherein the per-queue-based backpressure flow control is realized utilizing the MAC control frame specifying a backpressure time value for an individual queue.

4. The MAC module of claim 2, wherein the remote laser power control is realized utilizing the MAC control frame specifying a laser shutdown time for a transmitter or a receiver.

5. The MAC module of claim 2, wherein setting thresholds for MPCP REPORT is realized utilizing the MAC control frame specifying a threshold value for an individual queue in a queue set.

6. The MAC module of claim 2, wherein facilitating MAC layer data encryption includes utilizing the MAC control frame to select from at least one a group consisting of:
 passing a new key; and
 marking a time for key switching.

7. The MAC module of claim 2, wherein multicast registration is realized utilizing the MAC control frame specifying a multicast Logic Link Identifier (LLID) and a unicast LLID.

8. The MAC module of claim 1, wherein the MAC control frame is an extension of an MPCP MAC control frame.

9. The MAC module of claim 8, wherein the MAC control frame is an extension of an MPCP GATE frame facilitating assignment of a transmission slot for an individual queue.

10. The MAC module of claim 9, wherein the extension of the MPCP GATE frame further facilitates assigning a plurality of transmission slots with varying granularities.

11. The MAC module of claim 8, wherein the MAC control frame is an extension of an MPCP REPORT frame further facilitating reporting of queue lengths with varying granularities.

12. The MAC module of claim 8, wherein the MAC control frame is an extension of an MPCP REGISTER_REQ frame further facilitating reporting of laser turn on and turn off times of an optical network unit (ONU).

13. The MAC module of claim 8, wherein the MAC control frame is an extension of an MPCP REGISTER frame further facilitating multicast registration and setting of a threshold value for an individual queue in a queue set.

14. The MAC module of claim 8, wherein the MAC control frame is an extension of an MPCP REGISTER_ACK frame.

15. An Optical Line Terminal (OLT), comprising:
 a Media Access Control (MAC) module configured to generate a Media Access Control (MAC) frame as an extension of a Multi-Point Control Protocol (MPCP) MAC control frame, the MAC frame including:
  an organizationally unique identifier (OUI) field;
  an OUI-specific operation code (opcode) field; and
  a data field corresponding to the OUI-specific opcode field; and
 a processor configured to facilitate an Ethernet Passive Optical Network (EPON) function based on the data field, the EPON function including multicast registration and setting of a threshold value for an individual queue in a queue set.

16. The OLT of claim 15, wherein the EPON function further includes at least one selected from a group consisting of:
 per-queue-based backpressure flow control for an optical network unit (ONU);
 remote laser power control of the ONU;
 setting thresholds for multipoint control protocol (MPCP) REPORT;
 phase-synchronized clock transport to the ONU;
 transport of time-of-day (TOD) information to the ONU;
 MAC layer data encryption;
 idle control.

17. The OLT of claim 16, wherein the per-queue-based backpressure flow control is realized utilizing the MAC control frame specifying a backpressure time value for an individual queue.

18. The OLT of claim 16, wherein the remote laser power control is realized utilizing the MAC control frame specifying a laser shutdown time for a transmitter and/or a receiver on the ONU.

19. The OLT of claim 16, wherein setting thresholds for MPCP REPORT is realized utilizing the MAC control frame specifying a threshold value for an individual queue in a queue set on the ONU.

20. The OLT of claim 16, wherein facilitating MAC layer data encryption includes utilizing the MAC control frame to select from at least one of a group consisting of:
 passing a new key to the ONU; and
 marking a time for key switching.

21. The OLT of claim 16, wherein multicast registration is realized utilizing the MAC control frame specifying a multicast Logic Link Identifier (LLID) and a unicast LLID.

22. The OLT of claim 15, wherein the MAC control frame is an extension of an MPCP GATE frame, facilitating assignment of a transmission slot for an individual queue.

23. The OLT of claim 22, wherein the extension of the MPCP GATE frame further facilitates assigning a plurality of transmission slots with varying granularities.

24. An optical network unit (ONU), comprising:
   a frame parser configured to parse a first Media Access Control (MAC) control frame; and
   a frame formatter configured to generate a second MAC control frame,
   wherein the first MAC control frame and the second MAC control frame comprise an extension of an Multi-Point Control Protocol (MPCP) REPORT frame, the first MAC control frame and the second MAC control frame including:
      an organizationally unique identifier (OUI) field;
      an OUI-specific operation code (opcode) field; and
      a data field corresponding to the OUI-specific opcode field; and
   a processor configured to facilitate an Ethernet Passive Optical Network (EPON) function based on the data field, the EPON function including reporting queue lengths with varying granularities based on the data field.

25. The ONU of claim 24, wherein the EPON function further includes at least one selected from a group consisting of:
   per-queue-based backpressure flow control for the ONU;
   remote laser power control of the ONU;
   setting thresholds for multipoint control protocol (MPCP) REPORT;
   phase-synchronized clock transport to the ONU;
   transport of time-of-day (TOD) information to the ONU;
   MAC layer data encryption;
   multicast registration; and
   idle control.

26. The ONU of claim 24, wherein the first MAC control frame and the second MAC control frame are an extension of a respective first MPCP MAC control frame and a second MPCP control frame.

27. The ONU of claim 24, wherein the second MAC control frame is an extension of an MPCP REGISTER_REQ frame further facilitating reporting of laser turn on and turn off times of the ONU.

28. The ONU of claim 24, wherein the MAC control frame is an extension of an MPCP REGISTER_ACK frame.

* * * * *

UNITED STATES PATENT AND TRADEMARK OFFICE
CERTIFICATE OF CORRECTION

PATENT NO. : 8,335,235 B2
APPLICATION NO. : 12/725219
DATED : December 18, 2012
INVENTOR(S) : Davis et al.

Page 1 of 1

It is certified that error appears in the above-identified patent and that said Letters Patent is hereby corrected as shown below:

On the Title Page, Item (54), line 2, and in the Specification, Column 1, line 2, please replace "MESSAGE" with -- MESSAGES --

In the Specification

Column 17, line 62, please replace "to select from at least one a group" with -- to select at least one from a group --

Column 18, line 49, please add change "MAC layer data encryption;" to -- MAC layer data encryption; and --

Column 19, line 17, please replace "extension of an Multi-Point" with -- extension of a Multi-Point --

Signed and Sealed this
Thirtieth Day of July, 2013

Teresa Stanek Rea
*Acting Director of the United States Patent and Trademark Office*